UNITED STATES PATENT OFFICE.

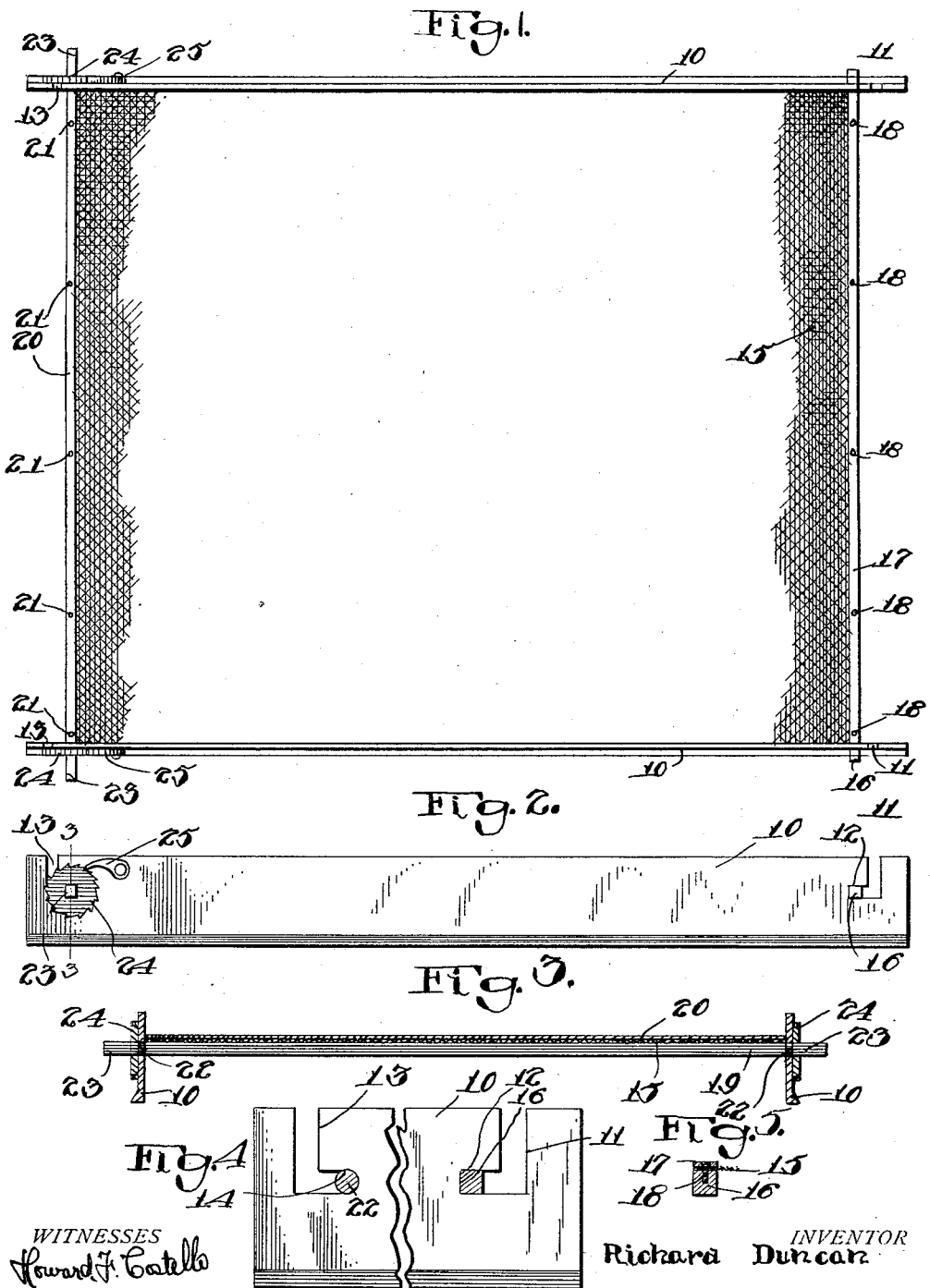

RICHARD DUNCAN, OF CROFTON, NEBRASKA.

FOLDING BED-SPRING.

1,113,316.  Specification of Letters Patent.  Patented Oct. 13, 1914.

Application filed February 6, 1913. Serial No. 746,630.

*To all whom it may concern:*

Be it known that I, RICHARD DUNCAN, citizen of the United States, residing at Crofton, in the county of Knox and State of Nebraska, have invented certain new and useful Improvements in Folding Bed-Springs, of which the following is a specification, reference being had therein to the accompanying drawing.

This invention relates to a spring construction, and the principal object of the invention is to provide a spring which is removably connected with the side rails of a bed, which is so constructed that it may be tightened by rotating the roller at one end of the bed.

Another object of the invention is to provide an improved type of side rail for the bed which is so constructed that the bars at the ends of the spring may be removably connected with the side rails and at the same time securely held in position.

With these and other objects in view this invention consists of certain novel combinations, constructions, and arrangements of parts as will be hereinafter fully described and claimed.

In the accompanying drawing:—Figure 1 is a top plan view of a bed provided with the improved spring. Fig. 2 is a side elevation of the bed. Fig. 3 is a section along the line 3—3, in Fig. 2. Fig. 4 is an enlarged side elevation of one of the side rails to show the manner of forming the slots at the ends of the rail. Fig. 5 is a sectional view through one of the end bars to show the manner of securing the spring to the end bar.

Referring to the accompanying drawing it will be seen that this spring is removably connected with the side rails 10 of the bed. Each of these rails is provided at one end with a bayonet slot 11, the inner end 12 of which is rectangular to prevent the cross bar at the lower end of the spring from rotating in the slot. The opposite end of the rail is provided with a bayonet slot 13 which is similar in construction to the slot 11 with the exception that the inner end portion 14 of the bayonet slot is circular so that the cross bar at the upper end of the spring may freely rotate in the bayonet slot 13.

The spring 15 is secured at one end to a cross bar 16 and is held in place by a strap 17 which rests upon the cross bar 16 and is secured in place by the screws 18. This cross bar is slightly longer than the width of the screen of the spring so that its ends will be positioned in the inner end portion 12 of the bayonet slot 11. It should be noted that the cross bar is of such size that it will fit tightly in the inner end portion of the bayonet slot 11, thus preventing it from having any tendency to turn. It should also be noted that the outer end portion of the bayonet slot is of greater diameter than the inner end portion so that the cross bar may easily be passed down into the bayonet slot and then forced into the inner end portion. This permits the cross bar to be easily inserted to prevent any danger of the cross bar slipping out of place.

The cross bar 19 is at the upper end of the spring, the spring being secured to this cross bar by means of a strap 20 held in place by screws 21. This cross bar 19 is positioned in the bayonet slot 13 and is provided with a rounded section 22 near each end so that when these rounded sections are positioned in the inner end portions 14 of the bayonet slot 13 the cross bar 19 may be readily rotated in order to tighten the spring. The outer end portions 23 are rectangular in order that a turning crank may be mounted upon the end portions of the cross bar 19 to tighten the spring. In order that the spring may be in a tightened position the toothed disks 24 have been mounted upon the end portions 23 of the cross bar, and latching pawls 25 pivotally secured to the side rails in such a position that they will normally rest upon the disks 24 and hold the spring in an adjusted position.

When setting up this spring the cross bar 16 is first put in position and the cross bar 19 is connected to the upper end of the side rails and tightened and rotated by means of a suitable crank so that the spring will be tightened and held in a tightened position by the pawls 25. If the spring is stretched it can be tightened by turning the cross bar 19 to take up the slack, and if it is desired to remove the spring the cross bar may be rotated enough to turn the pawls out of engagement with the disks and then turned to slacken the spring a sufficient amount to permit the cross bar to be removed from the bayonet slot 13. The spring can then be rolled upon the cross bar 19 and put away without taking up much space.

Having thus described the invention what is claimed as new, is:—

A bed comprising a plurality of side rails, each side rail provided with a plurality of vertically extending notch portions terminating in inwardly extending pockets, a square cross bar fitting in the pockets at one end of said side rails and held within said pockets against rotary movement, a second cross bar circular in cross section mounted within the pockets at the opposite ends of said side rails, a spring connected to said transverse bars, a ratchet wheel carried by said second transverse bar, a pawl engaging said ratchet wheel for holding said second transverse bar against rotation in one direction, said second transverse bar adapted to tighten said spring when said second transverse bar is rotated, said first mentioned transverse bar being adapted to hold one end of said spring in a set position for preventing said end from sagging when pressure is brought to bear upon said spring, a clamping plate secured to the upper face of said first mentioned transverse bar, said spring adapted to be placed between said second mentioned transverse bar and said plate, and clamping screws passing through said first mentioned transverse bar and said plate for firmly holding said spring in engagement therewith.

In testimony whereof I hereunto affix my signature in presence of two witnesses.

RICHARD DUNCAN.

Witnesses:
 GEO. H. RENNER,
 FRANK ULRICH.